United States Patent [19]

Mashimo

[11] 4,230,189
[45] Oct. 28, 1980

[54] DRILLED HOLE END ADJUSTING ARRANGEMENT

[75] Inventor: Toru Mashimo, Hiroshima, Japan
[73] Assignee: Toyo Kogyo Co., Ltd., Aki, Japan
[21] Appl. No.: 914,747
[22] Filed: Jun. 7, 1978
[30] Foreign Application Priority Data
Jun. 7, 1977 [JP] Japan .................................. 52-66998
[51] Int. Cl.² .......................... B23Q 5/00; E21C 5/00
[52] U.S. Cl. ......................................... 173/4; 173/11; 173/43
[58] Field of Search ......................... 33/1 H, 302, 304; 73/151.5; 173/4, 11, 20, 21, 43, 1, 2; 248/2, 16; 408/10, 14

[56] References Cited

U.S. PATENT DOCUMENTS

| | | | |
|---|---|---|---|
| 3,590,930 | 7/1971 | Gronfors | 173/43 X |
| 3,721,304 | 3/1973 | Hanson | 173/2 |
| 3,891,039 | 6/1975 | Lagerstrom | 73/151.5 X |
| 3,896,885 | 7/1975 | Dahlstrom et al. | 173/2 |
| 4,113,033 | 9/1978 | Lindblad | 173/4 X |

FOREIGN PATENT DOCUMENTS

274040  9/1970  U.S.S.R. ........................................ 173/4

*Primary Examiner*—Lawrence J. Staab
*Attorney, Agent, or Firm*—Wenderoth, Lind & Ponack

[57] ABSTRACT

A drilled hole end adjusting arrangement for a drilling machine or the like mounted on a boom structure in which the positions of the drilling machine are located such that ends of drilled holes are in a predetermined plane by positioning the boom structure in a rectangular coordinate plane established immediately in front of a working face. The depths to which the holes are drilled are caused to be such that the ends are in a plane parallel to the rectangular coordinate plane by supplying numerical instructions to the boom structure so that the positioning is carried out with high accuracy and the controls for the boom structure can be quickly programmed.

3 Claims, 7 Drawing Figures

DRILLED HOLE END ADJUSTING ARRANGEMENT

BACKGROUND OF THE INVENTION

The present invention relates to an adjusting arrangement and more particularly, to a drilled hole end adjusting arrangement for a drilling machine or the like mounted on a boom or jib structure, in which arrangement, the positions of the ends of the drilled holes are adjusted so as to be in a plane parallel to a rectangular coordinate plane established immediately in front of working face to be drilled irrespective of the unevenness of such a working face.

Commonly, drilling machines, for example, rock drills or rock borers, are widely employed in mining, tunnel excavation, etc., for drilling rocks to form openings or holes in such rocks so as to enable placing therein of explosives and the like for blasting or for sampling rock cuttings to determine the mineral content of ore. Such a drilling machine is normally supported by an associated boom or jib structure which is mounted on a vehicle such as a truck or crawler and operated, for example, by hydraulic rams for correct positoning of the bit of the drilling machine with respect to the rock or object to be drilled.

The conventional arrangement as described above, however, has a serious disadvantage in that, since the movement of the boom structure is based on particular spherical coordinates or spherical loci different from rectangular coordinates or rectangular loci well suited to human senses, it has been extremely difficult to designate proper positions of such a boom structure in an efficient manner. More specifically, in the conventional arrangement as described above, it is a general practice, for example, as disclosed in U.S. Pat. No. 3,980,142, to set up servo or servo-mechanism by detecting displacement of the hydraulic cylinders for driving the boom structure, and since it is difficult to numerically designate the position of the boom distal end, i.e., the position of the bit of the drilling machine, there has been employed a system known as a reproduction control system (i.e., utilizing the so-called play back method) in which the positioning work is preliminarily effected by manual operation so as to be memorized for subsequent reproduction. The known play back method as described above, however, has such drawbacks that when the positions of the ends of drilled holes are to be adjusted so as to be in a predetermined plane with respect to an uneven working face, it is necessary to memorize the drilling position every time the depth of drilling is altered, and the memorizing operation is complicated and requires considerable time. Moreover, because the programming of the operating machine (i.e. drilling machine) must be by human skill, this not only reduces working efficiency, but tends to be erroneous, and is not capable of numerical designation of the positions.

SUMMARY OF THE INVENTION

Accordingly, an essential object of the present invention is to provide a drilled hole end adjsuting arrangement for a drilling machine or the like in which the positions of the drilling machine are located such that the ends of drilled holes are in a predetermined plane, the location of the drilling machine being carried out in an efficient manner with substantial elimination of the disadvantages inherent in the conventional arrangements of this kind.

Another important object of the present invention is to provide a drilled hole end adjusting arrangement of the above described type which has a simple construction and functions in a stable in functioning with a high reliability, and can be readily incorporated into drilling machines of various types at low cost.

In accomplishing these and other objects, according to the present invention, the drilled hole end adjusting arrangement comprises means by which that instructions for the boom structure positioning and drilling length or depth are supplied for a drilling pattern having the drilling position on a rectangular coordinate plane established immediately in front of the working face to be drilled and also by indicating the drilling depth from said drilling position, and said drilling depth from said rectangular coordinate plane is corrected by an arithmetic unit in response to the amount of displacement of a guide cell of the boom structure from said rectangular coordinate plane to the actual uneven plane for the working face, whereby the instruction of the actual drilling depth given to the boom structure is adjusted so that the ends of the drilled holes lie in the predetermined plane parallel to said rectangular coordinate plane.

By the arrangement of the present invention as described above, not only can the drilling depth which causes the ends of the holes to be in the plane parallel to said rectangular coordinate plane be readily supplied as numerical values with high accuracy, but the program for supplying these values can be formed quickly in an efficient manner.

These and other objects and features of the present invention will become apparent from the following description taken in conjunction with the preferred embodiment thereof with reference to the accompanying drawings, in which;

Before the description of the present invention proceeds, it is to be noted that like parts are designated by like reference numerals and symbols throughout several views of the accompanying drawings.

DETAILED DESCRIPTION OF THE INVENTION

Figure 1:
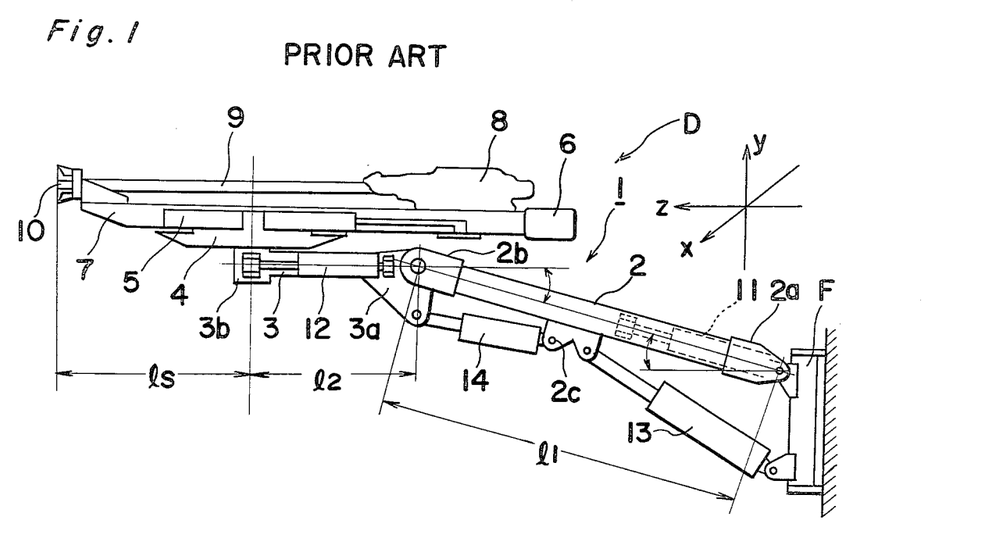
FIG. 1 is a side elevational view showing a conventional drilling machine mounted on a boom structure to which a drilled hole end adjusting arrangement according to the present invention may be applied.

Referring now to the drawings, there is shown in FIG. 1 one example of a conventional drilling machine and boom construction D to which the drilled hole end adjusting arrangement according to the present invention may be applied. The drilling machine and boom construction D of FIG. 1 generally comprises a boom structure or boom means 1 including a first boom 2 pivotally connected at its one end 2a to a base F secured to a vehicle such as a truck and the like (not shown), a second boom 3 pivotally connected at its one end 3a to the other end 2b of the first boom 2, and a hydraulic cylinder 5 for a guide cell 7 secured to the other end 3b of said second boom 3 by a cell mounting 4. The guide cell 7 has a feed motor 6 attached at its rear end and is slidably mounted on the hydraulic cylinder 5 for reciprocation of said guide cell 7 by actuation of the hydraulic cylinder 5, and a drilling machine 8 having a bit 10 attached to one end of a rod 9 is reciprocatingly mounted on the guide cell 7 for advancing and retracting movement of said drilling machine 8 during a drilling operation. The boom means 1 on which the drilling machine 8 is mounted is arranged to be displaceable in swinging movement toward the left and right in a horizontal direction (direction x in FIG. 1), back and forth in the horizontal direction (direction z in FIG. 1) and also vertically (direction y in FIG. 1), and for the above purpose, a first hydraulic cylinder 11 for boom swing and a second hydraulic cylinder 12 for guide cell swing are respectively connected to the first boom 2 and second boom 3 for driving the latter in swinging movement in the horizontal direction, while a third hydraulic cylinder 13 for boom lift is pivotally connected at its one end to the base F and at its other end to a bracket 2c secured to an approximately central portion of the first boom 2, with a fourth hydraulic cylinder 14 for guide cell lift being connected at its one end to the bracket 2c and at its other end to the end 3a of the second boom 3 for vertically driving the first and second booms 2 and 3 and the guide cell 7 as shown in FIG. 1.

Figure 2:
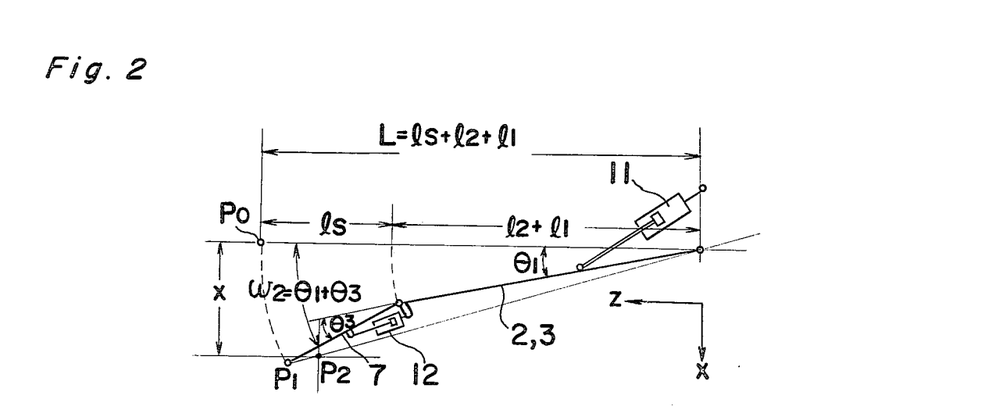
FIGS. 2 and 3 are diagrams for explaining the of displacement booms of the boom structure of FIG. 1.
Figure 3:
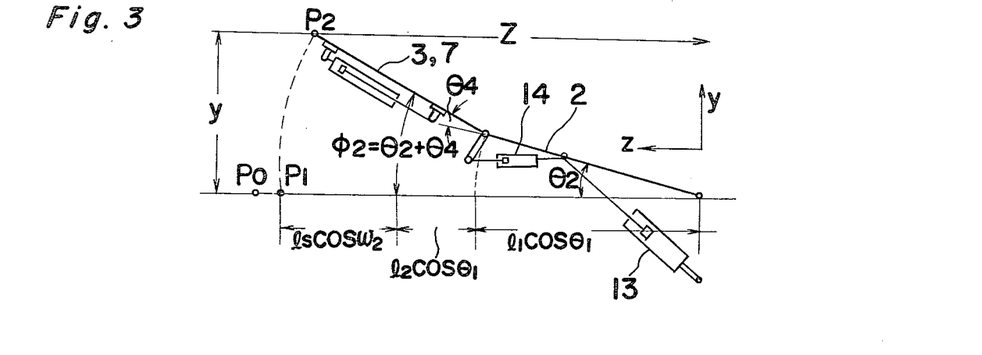
Figure 4:
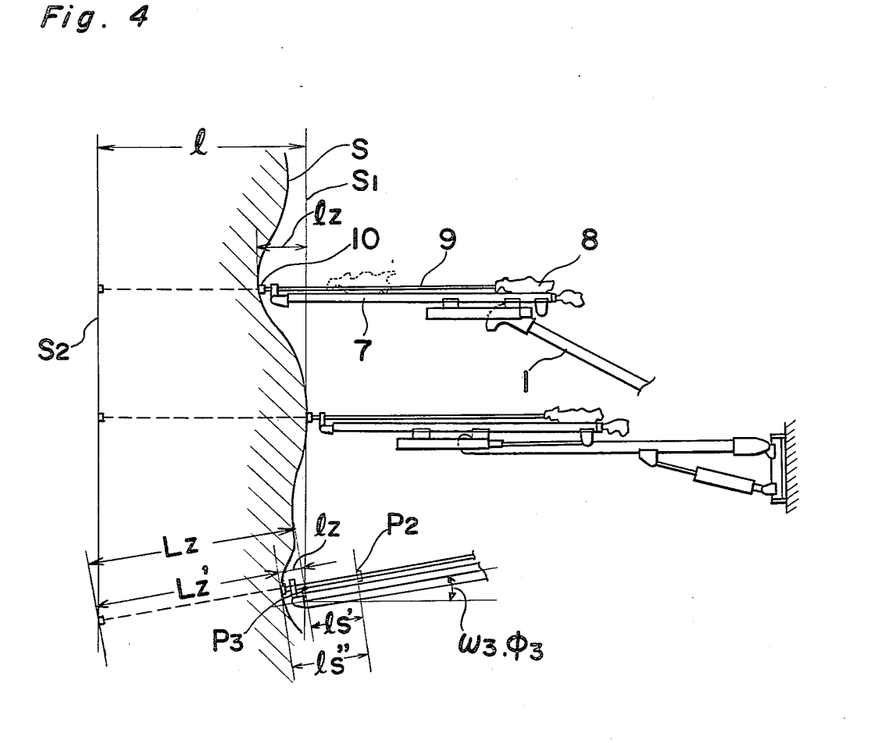
FIG. 4 is a diagram explanatory of the relation between the drilling machine and drilled hole end face.

Referring particularly to FIGS. 2 to 4, the relation between the amount of movement of each of the hydraulic cylinders 11 to 14 and the distal end of the boom means 1 (i.e., the distal end of the guide cell 7) moving according to the movement of the hydraulic cylinders 11 to 14 will be analyzed hereinbelow. In FIG. 1, the length of the first boom 2 is represented by $l_1$, and that of the second boom 3 by $l_2$, while the length from the forward end 3b of the second boom 3 to the forward end of the guide cell 7 (i.e., the amount of movement of the guide cell 7) is denoted by $l_s$. It is to be noted here, however, that the length $l_s$ denotes the distance to the distal end of the bit 10 when the bit 10 is projecting from the forward end of the guide cell 7.

A rectangular coordinate system $Q_A$ which has the x-z plane extending in the horizontal direction and the x-y plane extending in the vertical direction is thus established in front of the working face relative to the base on which the boom structure is mounted, and when the boom means 1 is on the z axis, the distal end thereof is located at a point $P_0$ in FIGS. 2 and 3. Upon actuation of the first hydraulic cylinder 11 for the boom swing and second hydraulic cylinder 12 for the guide cell swing so as to move the first and second booms 2 and 3 through an angle $\theta_1$ and the guide cell 7 through an angle $\theta_3$ in the horizontal plane (i.e., plane x-z in FIG. 2) by the extension of the piston rod of the hydraulic cylinder 11 and retraction of the rod of the hydraulic cylinder 12, the distal end is shifted from the point $P_0$ as described above to a point $P_1$ in FIG. 3. Thereafter, when the first and second booms 2 and 3 are respectively moved in the vertical plane (i.e., plane y-z in the drawing) through angles $\theta_2$ and $\theta_4$ by actuation of the third hydraulic cylinder 13 for the boom lift and the fourth hydraulic cylinder 14 for the guide cell lift, the distal end is shifted from the point $P_1$ to a point $P_2$. The position $x_2$, $y_2$ and $z_2$ of the point $P_2$ in the rectangular coordinate system $Q_A$ and direction $\omega_2$ and $\phi_2$ of the guide cell 7 are given by the following equation (1).

Position:

$$x_2 = l_1 \sin \theta_1 \cdot \cos \theta_2 + \{l_2 \sin \theta_1 + l_s \sin(\theta_1 + \theta_3)\} \cdot \cos(\theta_2 + \theta_4)$$

$$y_2 = l_1 \cos \theta_1 \cdot \sin \theta_2 + \{l_2 \cos \theta_1 + l_s \cos(\theta_1 + \theta_3)\} \cdot \sin(\theta_2 + \theta_4)$$

$$z_2 = l_1 \cos \theta_1 \cdot \cos \theta_2 + \{l_2 \cos \theta_1 + l_s \cos(\theta_1 + \theta_3)\} \cdot \cos(\theta_2 + \theta_4)$$

Direction:

Horizontal direction: $\omega_2 = \theta_1 + \theta_3$

Vertical direction: $\phi_2 = \theta_2 + \theta_4$ \hfill (1)

In other words, the position of the point $P_2$ and the direction of the guide cell relative to the x-z and y-z planes are denoted by the equation (1) in the rectangular coordinate system $Q_A$ $(x_2, y_2, z_2, \omega_2, \phi_2)$ and also in the movable coordinate system $Q_B(\theta_1, \theta_2, \theta_3, \theta_4, l_s)$ of the boom means 1, which systems are interchangeable with each other. It is to be noted that, since lengths $l_1$ and $l_2$ are constant values, positions in the movable coordinate system $Q_B$ can be shown as parameters of $\theta_1$, $\theta_2$, $\theta_3$, $\theta_4$ and $l_s$.

$$Q_A(x_2, y_2, z_2, \omega_2, \phi_2) \rightleftarrows Q_B(\theta_1, \theta_2, \theta_3, \theta_4, l_s)$$

Accordingly, controlling of the positions and directions of the guide cell at points $P_0$, $P_1$, $P_2$ ... and $P_n$ in the rectangular coordinate system can be achieved, if a coordinate converter $[Q_A \rightarrow Q_B]$ and a positioning servo control unit for the angles $\theta_1$, $\theta_2$, $\theta_3$ and $\theta_4$ and length $l_s$ are provided.

Meanwhile, as shown in FIG. 4, when the plane S of the working face is uneven or drilling is to be carried out at an angle with respect to the plane S, procedures are taken by utilization of the above analysis to make the ends $S_2$ of the drilled holes lie on a plane parallel to drilling plane $S_1$ in the rectangular coordinate system $Q_A$ immediately before the working face.

(i) Based on the above analysis, the distal end of the guide cell 7 mounted on the boom structure 1 is brought into alignment with the drilling position in the drilling plane $S_1$, with the values of the position of the drill at the drilling point in the above state being represented by $P_3(x_3, y_3, z_3, \omega_3, \phi_3)$, and the amount of displacement of the guide cell 7 at this time being denoted by $l'_s$.

(ii) Subsequently, the guide cell 7 is advanced until the distal end thereof contacts the plane S of the working face, and the distance of the advancement at this time is represented by $l_z$, while the total amount of displacement of the guide cell 7 is denoted by $l''_s$.

(iii) The distance between the drilling plane $S_1$ established in the rectangular coordinate system and the plane $S_2$ in which the hole ends lie is represented by l. Since the guide cell 7 is at an angle $\omega_3$ in the horizontal direction and an angle $\phi_3$ in the vertical direction, to plane $S_1$ the drilling length or depth $L_z$ through which the drilling machine on the guide cell 7 must move is given by the following equation.

$$L_z = \frac{l}{\cos\omega_3 \cdot \cos\phi_3} \quad (2)$$

(iv) Accordingly, the depth $L_z$ to be drilled by the drilling machine on the guide cell 7 is represented by the equation as follows:

$$L_z' = L_z - l_z \quad (3)$$
$$= L_z - (l_s'' - l_s')$$

Therefore, by providing arithmetic units for calculating the above equations (2) and (3), the ends of the drilled holes can be caused to be in a plane parallel with the drilling plane $S_1$ established immediately in front of the working face.

Figure 5:
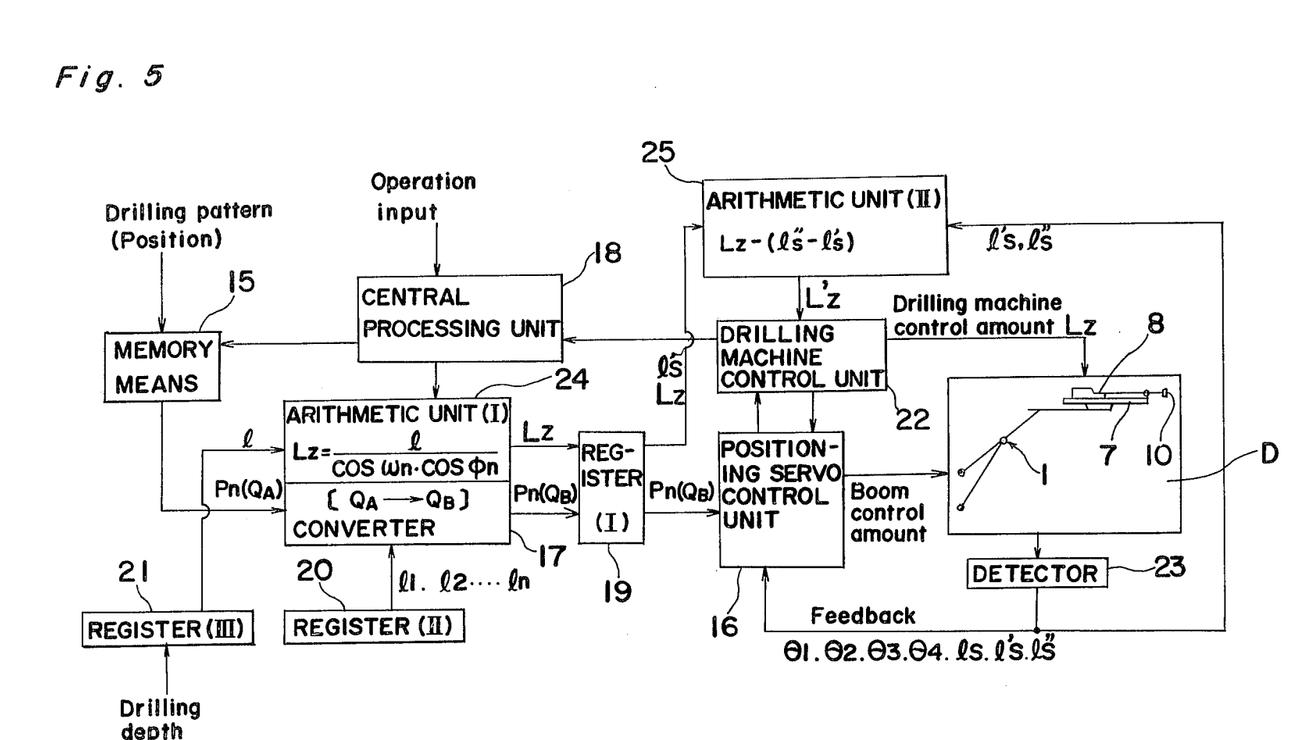
FIG. 5 is a block circuit diagram showing the construction of the drilled hole end adjusting arrangement according to the present invention.

Referring particularly to the block diagram of FIG. 5 a detector 23 is provided to calculate the values of working distances ls, l's and l''s and working direction $\theta_1$–$\theta_4$ of the boom means from the value of the amount of displacement of the hydraulic cylinder 5 for the guide cell 7 and the hydraulic cylinders 11–14 for the first and second booms 2 and 3 due to the supplying of hydraulic fluid to the hydraulic cylinder 5 and 11–14.

The two arithmetic units or detectors 23 operate to work out the angles of displacement of the boom means 1 upon receipt of detection signals indicating the displacements of the hydraulic cylinders 11 to 14 for driving the first and second booms 2 and 3, and of the hydraulic cylinder 5 for the guide cell 7, and are coupled to the positioning servo control unit 16 so as to calculate and feed back the angles of displacement ($\theta_1$, $\theta_2$, $\theta_3$ and $\theta_4$) and the amount of displacement or amount of movement $l_s$ of the guide cell 7 for positioning of said boom means 1.

Figure 6:
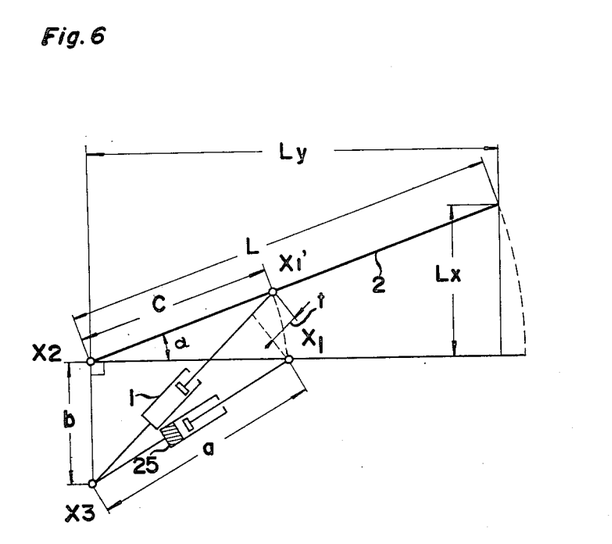
FIG. 6 is a schematic diagram showing the relation between the angles of the boom and amounts of displacement of hydraulic cylinders for driving the boom.

Referring particularly to FIG. 6 showing the first boom 2 in a simplified form, the principle for detecting the angles of displacement $\theta_1$ to $\theta_4$ directly from the displacements of the driving hydraulic cylinders 11 to 14 without the arithmetic units 23 or indirectly through the arithmetic units 23 will be explained hereinbelow.

In FIG. 6, when the first boom 2 is in a horizontal state, a triangle $\Delta X_1 X_2 X_3$ can be defined which is right-angled. Accordingly if the lengths of the respective sides thereof are represented by a, b and c, the following relation is established.

$$a^2 = b^2 + c^2 \quad (2)$$

If the point $X_1$ is shifted to a point $X'_1$, by moving boom 2 upward through an angle along side a distance between the points $X_1$ and $X'_1$ is increased by t, and the following equation is established.

$$(a + t)^2 = (b + c \sin\alpha)^2 + (c \cos\alpha)^2 \quad (3)$$
$$= b^2 + c^2 + 2bc \sin\alpha$$

From the equations (2) and (3), $$\sin\alpha = \frac{t^2 + 2at}{2bc} \quad (4)$$

Therefore, the angle $\alpha$ may be represented by the following equation.

$$\alpha = \sin^{-1} \frac{t^2 + 2at}{2bc} \quad (5)$$

In the above equation (5), if a/bc t is replaced by T.

$$\alpha = \sin^{-1} \{\frac{bc}{2a^2} T^2 + T\}$$

and if $bc/a^2$ is further replaced by $K_1$, the equation (5) may be replaced as follows.

$$\alpha = \sin^{-1} (\frac{K_1}{2} T^2 + T) \quad (6)$$

As described above, the angle $\alpha$ of the boom is obtained by the displacement T of the hydraulic cylinder by the use of the equation (6).

More specifically, the result as described above is achieved by the employment of the two arithmetic units 23 connected as follows and carrying out the indicated calculation (in this case, employment of digital arithmetic units is advantageous).

Figure 7:
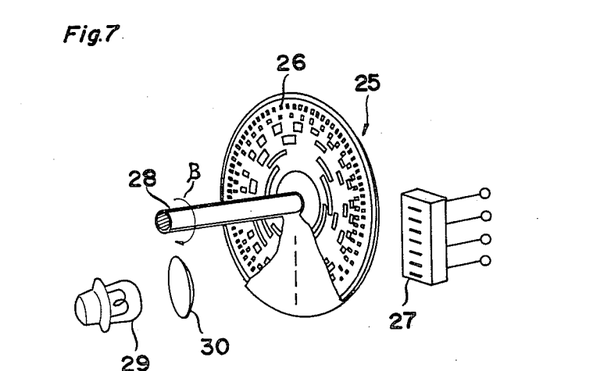
FIG. 7 is an exploded view of an encoder employed in the arrangement of FIG. 5.

For detection of the value T, an encoder 25 as shown in FIG. 7 may be incorporated in each of the driving hydraulic cylinders. The encoder 25 is installed on the axis of each of the driving hydraulic cylinders 11 to 14 at the inner end of the cylinder and includes an apertured rotary disc 26 fixed to a shaft 28 and a detector 27 accommodated in a casing (not shown) secured to the particular hydraulic cylinder for rotation of the rotary disc 26 by the shaft 28 as hydraulic medium is introduced into the hydraulic cylinder. The disc 26 comprises means to produce a 1, 0 pattern as a physical representation of the amount of flow of hydraulic fluid for detection by the detector 27. The encoder 25 employs light as the medium for physical representation and further includes a light source in the form of a lamp 29 and a condenser lens 30 to apply light onto the surface of the rotary disc 26 so that the light which passes through the apertures is detected by the detector 27 in the form of, for example, a photo transistor (not shown).

The relation between angle $\beta$ through which the rotary disc 26 rotates and the output signal T is represented by the following equation.

$$T = K_2 \beta \quad (7)$$

where $K_2$ is a constant. However, if the pattern of apertures in the disc of the encoder is used a function generator satisfying the equation (6) instead of the above equation (7), the angle $\alpha$ can be directly obtained from the encoder 25.

For obtaining such pattern of the apertures to operate as a function generator (encoder) satisfying the equation (6), the equation (7) is substituted into the equation (6).

$$\alpha = \sin^{-1}(\frac{K_1 K_2{}^2}{2}\beta^2 + K_2\beta)$$

Solving the above equation for $\beta$, the following relation is obtained.

$$\beta = \frac{-1 + \sqrt{1 + 2K_1 \cdot \sin\alpha}}{K_1 K_2} \quad (8)$$

wherein:
(1) $\beta > C$
(2) $1 + 2K_1 \sin\alpha > 0$

Thus, the relation of the pattern angle $\beta$ of the encoder with respect to the angle $\alpha$ of each arm of the boom means 1 is obtained.

Accordingly, by obtaining the pattern angle 8 by utilization of the encoder 25 as a particular function generator, the distances $L_X$ and $L_Y$ in FIG. 6 can consequently be detected.

The detector 23 is connected to the positioning servo control unit 16 for feeding back said values calculated by the detector to the positioning servo control unit 16 in which these values are compared with values fed from the register 19 to control the displacement of the boom means. This detector is also connected to the arithmetic unit 25 for feeding the actual values of the amount of displacement of the boom means 1, that is, the distance $l'_s$, when the boom means moves to the drilling point on the drilling plane and the working distance $l''_s$ when the boom means further moves to the actual drilling point in contact with the drill-working face or rock face, to said arithmetic unit 25.

The memory means 15 is provided to start the working values of position and direction for directly positioning the distal end of the boom structure 1 with respect to the drilling plane $S_1$ shown in FIG. 4 (i.e., the plane of an ideal working face plane) in the rectangular coordinate system immediately in front of the working face at positions according to the desired drilling pattern, and can have the values of the amounts of movement of the first and second booms 2 and 3 set therein as desired, for example, by dial means (not shown), etc. The memory means 15 coupled to the central processing unit 18 is further arranged to supply, under instruction from the central processing unit 18, the values for the drilling point in the rectangular coordinate system $Q_A$ to the converter 17 connected to the memory means 15. The positioning servo control unit 16 is connected to the register 19 and the boom structure and controls the amounts of movement of the pistons of the boom driving hydraulic cylinders 11 to 14 and the hydraulic cylinder 5 for the guide cell according to values for the amounts of movement and the angles of displacement of the first and second booms 2 and 3 of the boom means 1, supplied from the register 19 while the $[Q_A \rightarrow Q_B]$ converter 17 connected between the memory means 15 and register 19 functions to convert the values of the position and direction $(x_n, y_n, z_n, \omega_n, \phi_n)$ of the boom distal end $P_n(Q_A)$ in the rectangular coordinate system $Q_A$ into the coordinate system $Q_B$ (i.e., working direction angles $\theta_1, \theta_2, \theta_3$ and $\theta_4$ of each of the booms 2 and 3 and amount of displacement $l_s$ of the guide cell 7) for the boom structure 1 according to the constant values such as the lengths $l_1, l_2 \ldots$ and $l_n$ of the booms 2 and 3 stored in the register (II) 20 connected to said converter 17, and the values for the drilling position $P_n(Q_B)$, for example, $P_3(Q_B)$ converted to the boom coordinate system $Q_B$ are temporarily stored in the register (I) 19 connected between the converter 17 and the positioning servo control unit 16 for being supplied to said positioning servo control unit 16. The arithmetic unit (I) 24 for calculating the above equation (2) which is coupled to the register (III) 21 for storing the distance l between the drilling plane $S_1$ and hole end plane $S_2$ functions to work out the drilling depth $L_z$ from the distance l according to the equation (2), i.e., $L_z = l/(\cos\omega_3 \cdot \cos\phi_3)$ and to store the drilling depth $L_z$ temporarily in the register (I) 19 coupled thereto. The, the arithmetic unit (II) 25 which calculates the equation (3) described earlier and which is connected to the register (I) 19 and also to the detector 23 for detecting the total amount of displacement $l''_s$ of the guide cell 7 up to the working face plane S works out said equation (3), i.e., $L'_z = L_z - (l''_s - l'_s)$ from the drilling depth $L_z$, amount of displacement $l'_s$ of the guide cell 7 up to the drilling point on the rectangular coordinate plane $S_1$ supplied from the register (I) 19, and the amount of displacement $l''_s$ which is the displacement of the boom means necessary for the drill bit to contact the work face S, supplied from the detector 23 and transmits the actual drilling depth $L'_z$ thus obtained to the drilling machine control unit 22, so that the amount of displacement of the drilling machine 8 is controlled by the drilling machine control unit 22 through positioning termination signal to said unit 22 from the boom positioning servo control unit 16. The drilling machine control unit 22 is also connected to the central processing unit 18 for feeding a termination signal indicating the end of the drilling operation by the drilling machine control unit 22. The detector 23 functions to detect the values of the working distance and angles of displacement of the first and second booms 2 and 3 from the amounts of displacement of the hydraulic cylinders 11 to 14 for driving the boom as well as detection of the amount of displacement of the guide cell 7 and is connected to the positioning servo control unit 16 for feeding back the detected values to the boom positioning servo control unit 16 to control the positioning of the boom structure 1 and is also connected to the arithmetic unit 25 for feeding the detected values to the arithmetic unit 25 which calculates the actual drilling depth $L'_z$. The central processing unit 18 coupled to the memory means 15, $[Q_A \rightarrow Q_B]$ converter 17 and arithmetic unit (I) 24 functions to take out of the memory means 15 the values of the desired drilling position $P_n$ in the rectangular coordinate system $Q_A$ upon application of the operating input to said unit 18 for supplying information relating to such position $P_n$ to the converter 17 and unit 24, and simultaneously to again take out values for a new position from the memory means 15 upon receipt of the drilling termination signal from the drilling machine control unit 22. The register 20 is coupled to the converter 17 for feeding the constant values of the dimensions of the parts of the boom structure, for example, l1, l2, ..., ln.

It should be noted that, for the memory means 15, positioning servo control unit 16, central processing unit 18, drilling machine control unit 22 and arithmetic units, known devices can be used, such as for example, those disclosed in Japanese laid Open Utility Model Application Jitsukaisho No. 50/121001 and Japanese Laid Open Patent Application Takkaisho No. 50/121101, both published in 1975, and therefore, a detailed description thereof is omitted for brevity.

By the above arrangement, the values for the drilling positions in the drilling pattern for the drilling machine and to be carried out in the drilling plane $S_1$ in the rectangular coordinate system immediately in front of the working face is first stored in the memory means 15, and the drilling depth l from the drilling plane $S_1$ to the hole end plane $S_2$ is simultaneously stored in the register (III)21. Subsequently, upon application of the operating input to the central processing unit 18, the values for the desired drilling point $P_n(x_n,y_n,z_n,\omega_n,\phi_n)$ enters the $[Q_A \rightarrow Q_B]$ converter 17 and are converted into the boom coordinate system and thus the displacement angles $\theta_1$ to $\theta_4$ of the respective booms 2 and 3 amount of displacement $l'_s$ of the guide cell 7 are obtained, while the values for said drilling point $P_n$ are simultaneously fed into the arithmetic unit (I)24 from which the drilling depth $L_z$ for the guide cell 7 is obtained. These data thus obtained are temporarily stored in the register (I)19, and the amounts of movement of the respective cylinders 11 to 14 of the boom structure 1 are obtained at the positioning servo control unit 16 from the values is said register (I)19 for positioning the bit 10 at the distal end of the boom structure 1 on the drilling plane $S_1$. Upon contact of the advancing guide cell 7 with the uneven working face plane S after the above described positioning, the total amount of displacement $l''_s$ of the guide cell 7 up to such contact enters the arithmetic unit (II)24 for use in calculating the actual drilling depth $L'_z$ based on the values $L_z$ and $l_s$ supplied from the register (I)19, and according to the result of said calculation, the drilling machine 8 is controlled by the drilling machine control unit 22 to carry out drilling to the drilling depth $L'_z$. The drilling termination signal is fed into the positioning servo control unit 16 and central processing unit 18, and the values for the subsequent drilling point are taken out of the memory means 15. Such procedures as described above are repeated, and the drilling at the points in one particular drilling pattern is thereby completed.

As is clear from the foregoing description, according to the drilled hole end adjusting arrangement of the present invention, since the boom structure can be positioned on the rectangular coordinate plane established immediately in front of the working face, the depth to which the hole ends are to be drilled so they lie in the predetermined plane parallel to the rectangular coordinate plane is can readily be supplied in terms of numerical values with high accuracy, and programming is quickly effected in an efficient manner without requiring particular instruction. Furthermore, the drilled hole end adjusting arrangement of the present invention has the advantages that the drilling depth can be designated as desired, and accurate hole end adjustment is possible, even when the drilling machine is directed toward the working face at a predeterimed angle.

It should be noted here that in the foregoing embodiment, although the present invention is mainly described with reference to a drilled hole end adjusting arrangement for a drilling machine mounted on a boom structure, the concept of the present invention is not limited in its application to such a drilled hole end adjusting arrangement of a drilling machine, but may readily be applicable, for example, to a bottom face adjusting arrangement for a digging machine or the like mounted on a boom structure.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A drilled hole end adjusting arrangement for a drilling machine or the like which comprises;
   a boom structure on which the drilling machine is operably mounted;
   a memory unit for storing values of the position of the drilling machine at plurality of drilling points on a drilling plane immediately in front of a drill-working face and which are in a rectangular coordinate system;
   a converter unit connected to said memory unit for converting the values for a drilling point supplied from said memory means into values of working distance and working direction angle of the boom struction in a boom coordinate system;
   a positioning servo control unit connected to said converter unit and said boom structure for displacing said boom structure according to said values for the drilling point supplied from said converter unit for bringing the drilling machine to the drilling point of the drilling plane and also for displacing said boom structure so as to shift the drilling machine from said drilling point on the drilling plane into actual contact with the drill-working face at an actual drilling point;
   a drilling machine control unit connected to said positioning servo control unit and said drilling machine for starting the drilling operation of the drilling machine upon receipt of a signal indicating that positioning of the drilling machine by the positioning servo control unit is completed;
   a detector connected to said boom structure for calculating the values of the working distance and working direction angle of the boom structure from the position and direction of the drilling machine on said boom means after it has been displaced and shifted by the positioning servo control unit;
   a first register for storing a drilling depth of a drilled hole from said drilling plane to a plane parallel with said drilling plane;
   a first arithmetic unit connected to said first register and said converter unit for calculating the drilling depth at the direction angle of the boom structure positioned at the drilling point of the drilling plane; and
   a second arithmetic unit connected to said first arithmetic unit and said detector for calculating the actual drilling depth from drilling depth supplied from said first arithmetic unit and the working values supplied from said arithmetic unit, and also connected to said drilling machine control unit for supplying said actual drilling depth to said drilling machine control unit for controlling the drilling operation of the drilling machine.

2. A drilled hole end adjusting arrangement as claimed in claim 1, further comprising a central processing unit coupled to said memory means, said first arithmetic unit, said converter unit, and said drilling machine control unit for causing said memory means to supply the desired values and causing said first arithmetic unit and said converter unit to operate upon receipt of a signal indicating that the drilling operation of the drilling machine control unit is completed.

3. A drilled hole end adjusting arrangement as claimed in claim 1, further comprising:
- a second register coupled to said converter unit for supplying constant values of the sizes of parts of said boom structure to said converter unit; and
- a third register connected between said converter unit and said positioning servo control unit for storing the working values supplied from the converter unit for transfer of said working values to said positioning servo unit, and also connected between said first and second arithmetic units for storing the drilling depth supplied from the first arithmetic unit for transfer of said drilling depth to said second arithmetic unit.

* * * * *